(12) United States Patent
Matsuhira et al.

(10) Patent No.: US 8,587,807 B2
(45) Date of Patent: Nov. 19, 2013

(54) IMAGE PROCESSING APPARATUS WITH MECHANISM FOR ROTATING IMAGE

(75) Inventors: Mastatoshi Matsuhira, Suwa (JP); Makoto Oyanagi, Suwa (JP)

(73) Assignee: Seiko Epson Corporation, Tokyo (JP)

(*) Notice: Subject to any disclaimer, the term of this patent is extended or adjusted under 35 U.S.C. 154(b) by 920 days.

(21) Appl. No.: 12/612,611

(22) Filed: Nov. 4, 2009

(65) Prior Publication Data
US 2010/0110492 A1    May 6, 2010

(30) Foreign Application Priority Data

Nov. 5, 2008    (JP) .................................. 2008-284367

(51) Int. Cl.
*G06F 3/12* (2006.01)

(52) U.S. Cl.
USPC ......... 358/1.15; 358/1.13; 358/1.9; 358/1.18; 382/165

(58) Field of Classification Search
USPC ................................................. 382/292–297
See application file for complete search history.

(56) References Cited

U.S. PATENT DOCUMENTS

| | | | |
|---|---|---|---|
| 5,557,715 A | | 9/1996 | Ichiyanagi |
| 5,949,919 A * | | 9/1999 | Chen .............................. 382/276 |
| 5,991,450 A * | | 11/1999 | Ohsawa et al. ................ 382/245 |
| 6,043,897 A * | | 3/2000 | Morikawa et al. ............. 358/1.14 |
| 6,175,653 B1 * | | 1/2001 | de Queiroz .................... 382/233 |
| 7,061,638 B2 * | | 6/2006 | Yamada ......................... 358/1.15 |
| 7,570,822 B2 * | | 8/2009 | Matsuhira ...................... 382/233 |
| 7,616,357 B2 * | | 11/2009 | Kikuchi ......................... 358/486 |
| 2006/0088223 A1 * | | 4/2006 | Matsuhira ...................... 382/233 |
| 2007/0058218 A1 * | | 3/2007 | Kikuchi ......................... 358/474 |

FOREIGN PATENT DOCUMENTS

| | | |
|---|---|---|
| JP | 06-334834 A | 12/1994 |
| JP | 08-317225 A | 11/1996 |
| JP | 3661520 A | 3/2001 |
| JP | 2003-296054 A | 10/2003 |
| JP | 2006-313985 A | 11/2006 |

* cited by examiner

Primary Examiner — Twyler Haskins
Assistant Examiner — Dennis Dicker
(74) Attorney, Agent, or Firm — Kilpatrick Townsend & Stockton LLP

(57) ABSTRACT

An image processing apparatus includes a pre-rotation encoded data pair storing unit, a positional relationship storing unit, a post-rotation data pair creating unit, and an image creating unit. The pre-rotation encoded data pair storing unit stores a set of pre-rotation encoded data pairs. The set of pre-rotation encoded data pairs includes a plurality of pieces of pre-rotation encoded data that are data obtained by dividing object image data into a plurality of pieces of divided image data and individually encoding each of the plurality of pieces of divided image data, and pre-rotation position information that represents a position of the pre-rotation encoded data in the object image data, wherein the plurality of pieces of pre-rotation encoded data and the pre-rotation position information correspond to each other.

6 Claims, 16 Drawing Sheets

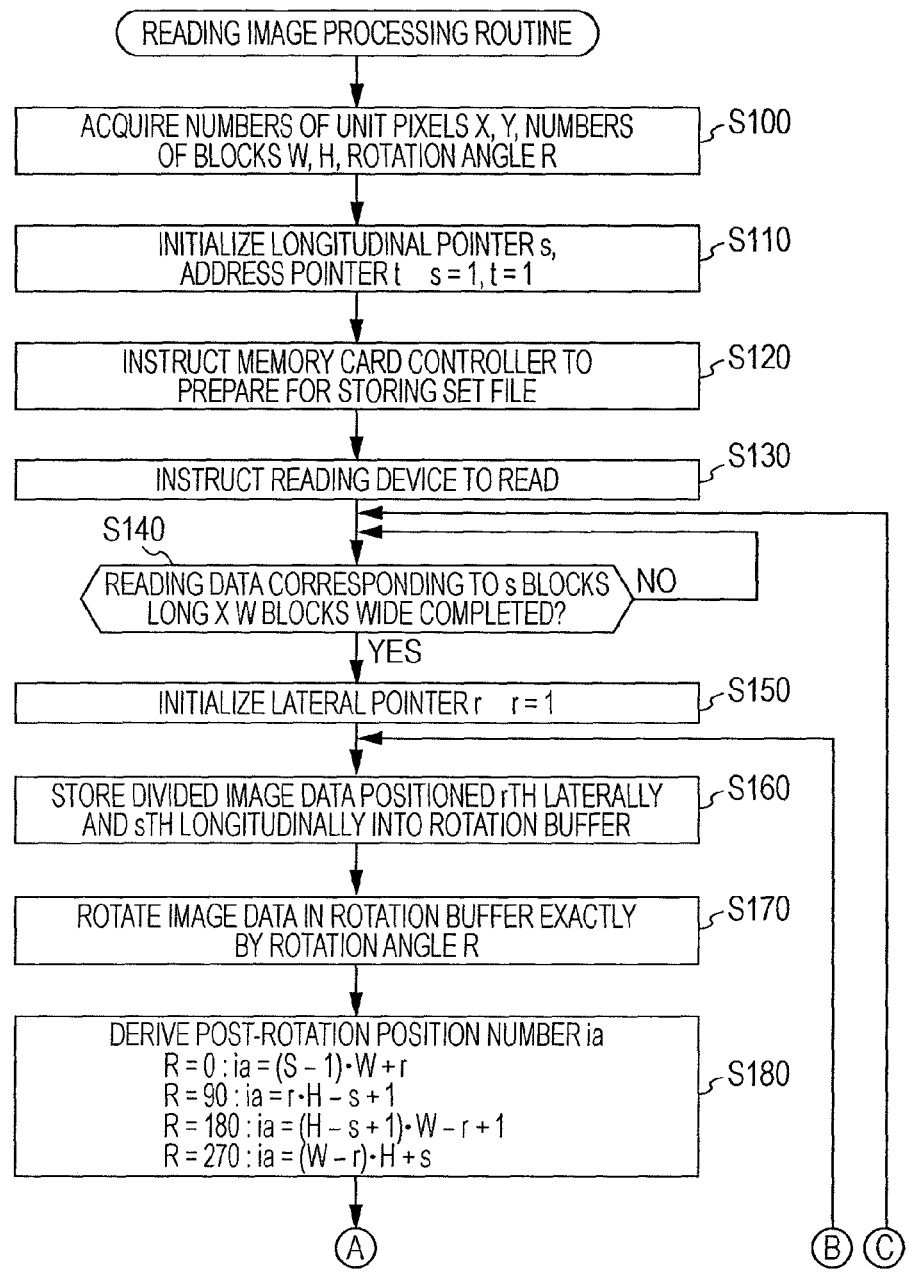

READING IMAGE PROCESSING ROUTINE

ACQUIRE NUMBERS OF UNIT PIXELS X, Y, NUMBERS OF BLOCKS W, H, ROTATION ANGLE R — S100

INITIALIZE LONGITUDINAL POINTER s, ADDRESS POINTER t    s = 1, t = 1 — S110

INSTRUCT MEMORY CARD CONTROLLER TO PREPARE FOR STORING SET FILE — S120

INSTRUCT READING DEVICE TO READ — S130

S140
READING DATA CORRESPONDING TO s BLOCKS LONG X W BLOCKS WIDE COMPLETED?  NO
↓ YES

INITIALIZE LATERAL POINTER r    r = 1 — S150

STORE DIVIDED IMAGE DATA POSITIONED rTH LATERALLY AND sTH LONGITUDINALLY INTO ROTATION BUFFER — S160

ROTATE IMAGE DATA IN ROTATION BUFFER EXACTLY BY ROTATION ANGLE R — S170

DERIVE POST-ROTATION POSITION NUMBER ia
$R = 0 : ia = (S - 1) \cdot W + r$
$R = 90 : ia = r \cdot H - s + 1$
$R = 180 : ia = (H - s + 1) \cdot W - r + 1$
$R = 270 : ia = (W - r) \cdot H + s$
— S180

(A)    (B) (C)

IMAGE PROCESSING APPARATUS WITH MECHANISM FOR ROTATING IMAGE

This application claims priority to Japanese Patent Application No. 2008-284367, filed Nov. 5, 2008, the entirety of which is incorporated by reference herein.

BACKGROUND

1. Technical Field

The present invention relates to an image processing apparatus.

2. Related Art

There is a need for rotating image data exactly by a given angle when handling image data obtained by digitizing an image.

For example, in the case of rotating image data that has been encoded using a JPEG (joint photographic experts group) scheme, a method of performing rotation after decoding the whole image data is conceivable. For this method, refer to paragraph 0009 of Japanese Patent No. 3661520.

Disadvantageously, this method requires a large capacity buffer to temporarily store the whole image data that has been decoded for rotation processing.

SUMMARY

An advantage of some aspects of the invention is that the capacity of a buffer required for rotation processing is decreased.

The invention employs the following measures to achieve the foregoing advantage.

An image processing apparatus according to a first aspect of the invention includes a pre-rotation encoded data pair storing unit, a positional relationship storing unit, a post-rotation data pair creating unit, and an image creating unit. The pre-rotation encoded data pair storing unit stores a set of pre-rotation encoded data pairs. The set of pre-rotation encoded data pairs includes a plurality of pieces of pre-rotation encoded data that are data obtained by dividing object image data into a plurality of pieces of divided image data and individually encoding each of the plurality of pieces of divided image data, and pre-rotation position information that represents a position of the pre-rotation encoded data in the object image data, wherein the plurality of pieces of pre-rotation encoded data and the pre-rotation position information correspond to each other. The positional relationship storing unit stores a relationship between the pre-rotation position information and post-rotation position information representing a position obtained by rotating the position represented by the pre-rotation position information exactly by a given angle. The post-rotation data pair creating unit sequentially reads out the pre-rotation encoded data pairs stored in the pre-rotation encoded data pair storing unit, decodes the pre-rotation encoded data included in the pre-rotation encoded data pairs into divided image data, and creates a plurality of post-rotation data pairs. The plurality of post-rotation data pairs each include post-rotation divided image data obtained by rotating the decoded divided image data exactly by the given angle, and post-rotation position information associated with the pre-rotation position information included in the pre-rotation encoded data pair, wherein the post-rotation divided image data and the post-rotation position information correspond to each other. The image creating unit arranges, for the plurality of post-rotation data pairs, the post-rotation divided image data included in each of the post-rotation data pairs at a position identified by the post-rotation position information included in the post-rotation data pair to create a post-rotation object image that is an image obtained by rotating the object image data exactly by the given angle.

In the image processing apparatus according to the first aspect of the invention, stored in the pre-rotation encoded data pair storing unit is a set of pre-rotation encoded data pairs that includes a plurality of pieces of pre-rotation encoded data that are data obtained by dividing object image data into a plurality of pieces of divided image data and individually encoding each of the plurality of pieces of divided image data, and pre-rotation position information that represents a position of the pre-rotation encoded data in the object image data, wherein the plurality of pieces of pre-rotation encoded data and the pre-rotation position information correspond to each other. From the pre-rotation encoded data pair storing unit, the pre-rotation encoded data pairs are sequentially read out, the pre-rotation encoded data included in the read-out pre-rotation encoded data pairs is decoded into divided image data, and a plurality of post-rotation data pairs are created. The created plurality of post-rotation data pairs each include post-rotation divided image data obtained by rotating the decoded divided image data exactly by a given angle, and post-rotation position information representing a position obtained by rotating the position represented by the pre-rotation position information included in the read-out pre-rotation encoded data pair exactly by the given angle, wherein the post-rotation divided image data and the post-rotation position information correspond to each other. Then, for the created plurality of post-rotation data pairs, the post-rotation divided image data included in each of the post-rotation data pairs is arranged at a position identified by the post-rotation position information included in the post-rotation data pair to create a post-rotation object image that is an image obtained by rotating the object image data exactly by the given angle.

Thus, a buffer configured to hold one piece of divided image data can perform rotation processing for every piece of divided image data obtained by dividing the object image data. This causes the required capacity of a buffer to be smaller than that in the case of rotating the whole object image data.

In the image processing apparatus according to the first aspect of the invention, the post-rotation data pair creating unit may be a unit that reads out the pre-rotation encoded data pairs in a given order specified by the post-rotation position information associated with the pre-rotation position information included in the pre-rotation encoded data pairs when sequentially reading out the pre-rotation encoded data pairs stored in the pre-rotation encoded data pair storing unit, and the image creating unit may be a unit that arranges the post-rotation divided image data in the given order when creating the post-rotation object image from the plurality of post-rotation data pairs.

Thus, the creating of post-rotation divided image data pairs and the arranging of post-rotation divided image data can be performed as pipeline processing. This enables the whole processing to be performed in a shorter time.

An image processing apparatus according to a second aspect of the invention includes an acquiring unit, a pre-rotation data pair creating unit, a positional relationship storing unit, and a post-rotation encoded data pair set creating unit. The acquiring unit acquires object image data. The pre-rotation data pair creating unit that divides the object image data to create a plurality of pieces of divided image data, creates a pre-rotation data pair. The pre-rotation data pair includes the divided image data and pre-rotation position information that represents a position of the divided image data in the object image data, wherein the divided image data and the pre-rotation position information correspond to each other. The positional relationship storing unit stores a relationship between the pre-rotation position information and post-rotation position information that represents a position obtained by rotating the position represented by the pre-rotation position information exactly by a given angle. The post-rotation encoded data pair set creating unit sequentially creates encoded data obtained by rotating the divided image data included in the pre-rotation data pair exactly by the given angle and encoding the rotated divided image data to create a set of post-rotation encoded data pairs including the encoded data and the post-rotation position information associated with the pre-rotation position information included in the pre-rotation data pair, wherein the encoded data and the post-rotation position information correspond to each other.

In the image processing apparatus according to the second aspect of the invention, the acquired object image data is divided to create a plurality of pieces of divided image data, and creates a pre-rotation data pair that includes the divided image data and pre-rotation position information representing a position of the divided image data in the object image data, wherein the divided image data and the pre-rotation position information correspond to each other. Then, encoded data obtained by rotating the divided image data included in the pre-rotation data pair exactly by a given angle and encoding the rotated divided image data is sequentially created to create a set of post-rotation encoded data pairs. The set of post-rotation encoded data pairs includes the encoded data and the post-rotation position information that represents a position obtained by rotating the position represented by the pre-rotation position information included in the pre-rotation data pair exactly by the given angle and that is associated with the pre-rotation position information included in the pre-rotation data pair, wherein the encoded data and the post-rotation position information correspond to each other.

Thus, a buffer configured to hold one piece of divided image data can perform rotation processing for every piece of divided image data obtained by dividing the object image data. This causes the required capacity of a buffer to be smaller than that in the case of rotating the whole object image data.

In the image processing apparatus according to the second aspect of the invention, even when the acquiring unit is acquiring the object image data, the pre-rotation data pair creating unit may sequentially create the divided image data from partial object image data that is part of the acquired object image data to allow the pre-rotation data pair including the divided image data and the pre-rotation position information corresponding to each other to be sequentially created.

Thus, processing that acquires object image data and processing that creates pre-rotation data pairs and post-rotation encoded data pairs can be performed as pipeline processing. This enables the whole processing to be performed in a shorter time.

An image processing apparatus according to a third aspect of the invention includes an acquiring unit, a dividing unit, an encoding unit, and an encoded data pair set creating unit. The acquiring unit acquires object image data. The dividing unit creates a plurality of pieces of divided image data into which the object image data is divided. The encoding unit creates encoded data obtained by encoding the divided image data. The encoded data pair set creating unit creates a set of encoded data pairs that includes the encoded data and position information representing a position of the encoded data in the object image data, wherein the encoded data and the position information correspond to each other.

In the image processing apparatus according to the third aspect of the invention, the acquired object image data is divided to create a plurality of pieces of divided image data, and the created divided image data is encoded to create encoded data. Then, a set of encoded data pairs is created. The set of encoded data pairs includes the encoded data and position information that represents a position of the encoded data in the object image data, wherein the encoded data and the position information correspond to each other.

Thus, if image data obtained by rotating the original image data is desired, divided image data obtained by decoding encoded data of each encoded data pair may be individually rotated and then arranged to the post-rotation position using position information. Accordingly, only a buffer configured to hold divided image data is required for processing during rotation. The required capacity of a buffer is smaller than that in the case of integrating the whole image data and thereafter rotating it.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
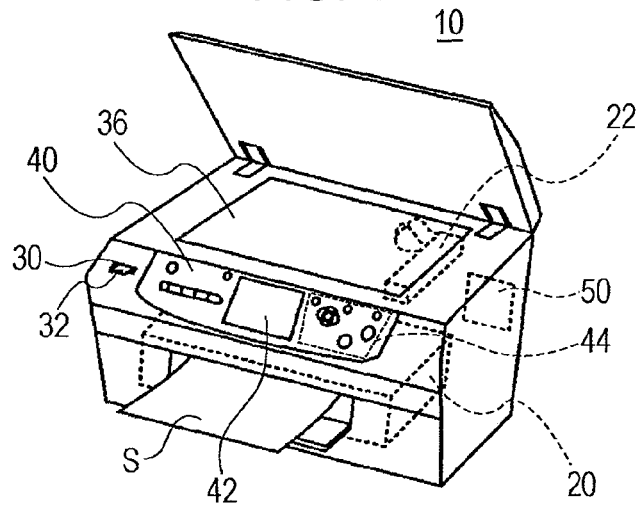
FIG. 1 is a configuration view showing a schematic configuration of a multifunction printer that is an embodiment of the invention.
Figure 2:
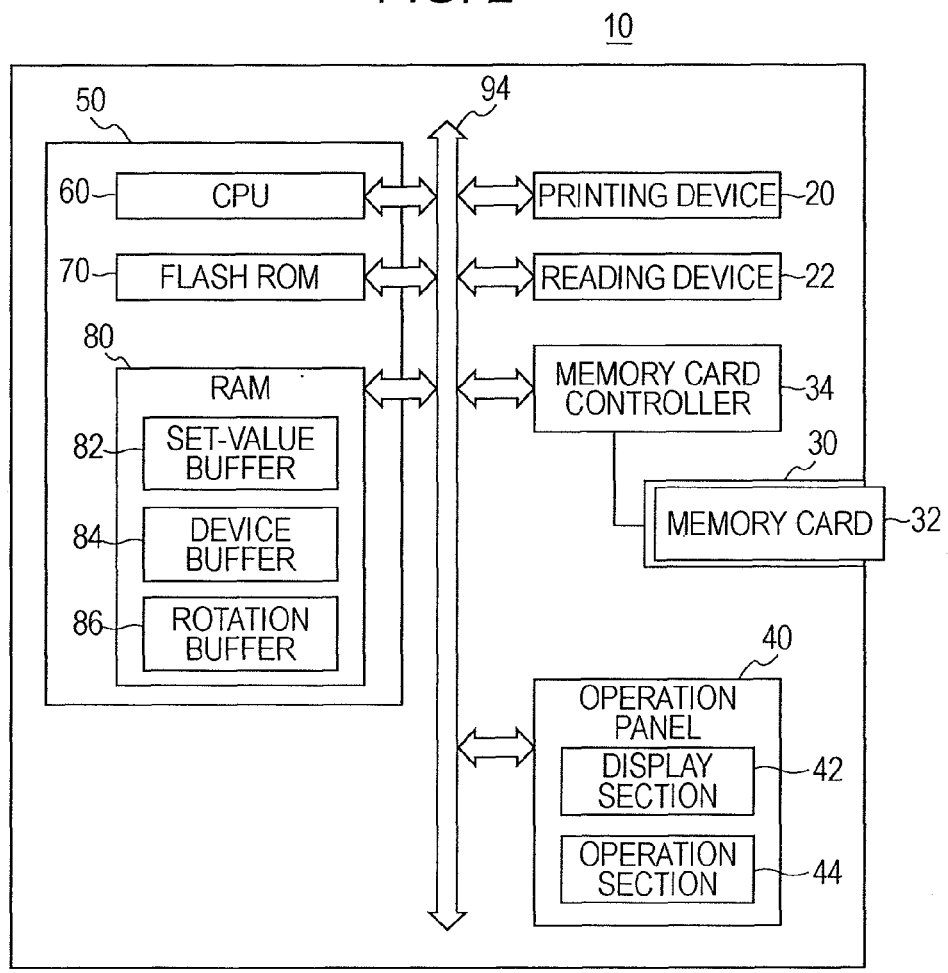
FIG. 2 is a block diagram representing electrical connections of the multifunction printer.

An embodiment of the invention is now described with reference to the drawings. FIG. 1 is an external view showing a schematic configuration of a multifunction printer 10 that is the embodiment of the invention, and FIG. 2 is a block diagram representing electrical connections of the multifunction printer 10.

As shown in FIG. 1, the multifunction printer 10 of this embodiment includes a printing device 20 that performs printing, a reading device 22 that reads an image, a memory card controller 34 that writes and reads data to and from a memory card 32 (see FIG. 2), an operation panel 40 that displays various information and inputs an instruction from a user, and a main controller 50 that is in charge of control of the entire printer. As shown in FIG. 2, this multifunction printer 10 is configured to enable the printing device 20, the reading device 22, the memory card controller 34, the operation panel 40 and the main controller 50 to exchange various control signals and data via a bus 94.

The printing device 20 is configured as a color printer mechanism used in a well-known ink jet method. When receiving a printing instruction from the main controller 50, the color printer mechanism performs printing by discharging ink onto a sheet of recording paper S from a printing head on the basis of a printing job that is the object of the printing instruction.

The reading device 22 is configured as a well-known, full-color scanner mechanism that reads a document placed on a glass plate 36 as image data when receiving a read instruction from the main controller 50. The reading device 22 has a well-known color image sensor. By the color image sensor, light that has been emitted toward a document and reflected from it is separated into colors of red (R), green (G) and blue (B) as read data.

The memory card controller 34 is configured to be able to input and output data from and to the memory card 32 inserted into a memory card slot 30 provided next to the operation panel 40. The memory card 32 can store image data encoded, for example, using a JPEG scheme.

The operation panel 40 includes a display section 42 that is a liquid crystal display, and an operation section 44 having a copy button, a printing button, a scan button, a power button and ten keys. The operation panel 40 displays various information on the display section 42 and inputs an instruction from a user through the operation of the operation section 44.

The main controller 50 is configured as a microprocessor mainly made up of a CPU (central processing unit) 60, and includes a flash ROM (read only memory) 70 that is electrically rewritable and in which data is held even when the power supply is turned off, and a RAM (random access memory) 80 that temporarily stores printing data.

The CPU 60 inputs various operation signals, various detection signals and various data from the printing device 20 and the reading device 22, and inputs operation signals generated in response to operation of the operation section 44 of the operation panel 40. The CPU 60 also outputs an instruction for printing to the printing device 20, outputs various control signals to the reading device 22, outputs to the memory card controller 34 data to be recorded onto the memory card 32, and outputs control signals to the display section 42 of the operation panel 40.

Various processing programs, various data, various tables and the like are stored in the flash ROM 70.

The RAM 80 includes a set-value buffer 82 for temporarily storing various set values, a device buffer 84 for temporarily storing data to be printed by the printing device 20 and data read by the reading device 22, and a rotation buffer 86 for temporarily storing divided image data when a process of rotating the divided image data, which will be described later, is performed.

The multifunction printer 10 of this embodiment can handle a set file in which a plurality of pieces of divided image data obtained by dividing the original image data are integrated into one in a form to be described later. Specifically, it is possible to divide the original image data read by the reading device 22 into a plurality of pieces of divided image data, and to store the plurality of pieces of divided image data in the form of a set file into the memory card 32. It is also possible to read a plurality of pieces of divided image data from a set file stored in the memory card 32, and to print the original image data using the printing device 20. The relationship between the original image data and the divided image data is shown in FIG. 3.

Figure 3:
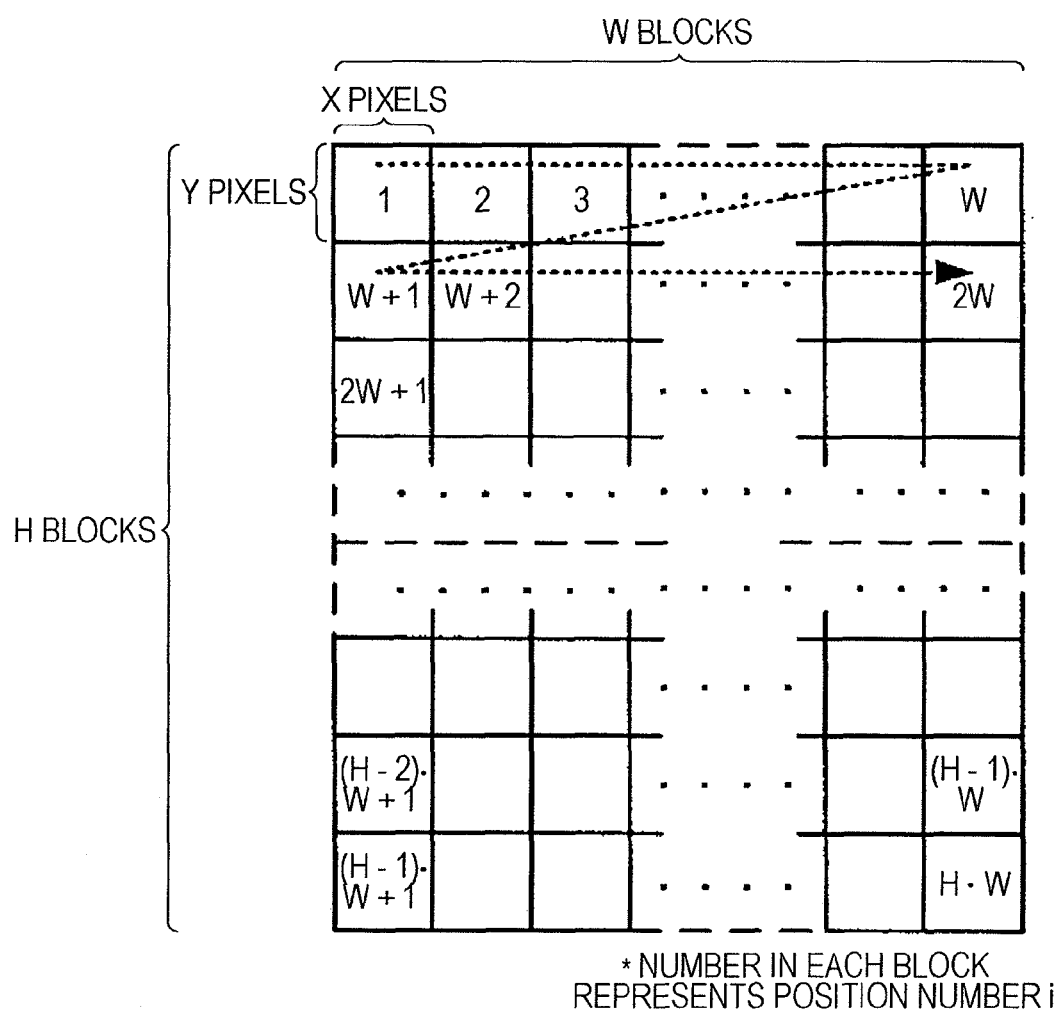
FIG. 3 is an explanatory view showing a relationship between original image data and divided image data.

As shown in FIG. 3, the divided image data is image data corresponding to one block obtained by dividing the original image data into a number of lateral blocks W in the longitudinal direction and a number of longitudinal blocks H in the longitudinal direction. The number of pixels in the lateral direction of this image data is represented as the number of lateral unit pixels X, and the number of pixels in the longitudinal direction is represented as the number of longitudinal unit pixels Y. As such, H×W pieces of divided image data are obtained from the original image. The H×W pieces of divided image data are each encoded into data using a JPEG scheme and are integrated into one, which is a set file. The data structure of the set file is shown in FIG. 4.

Figure 4:
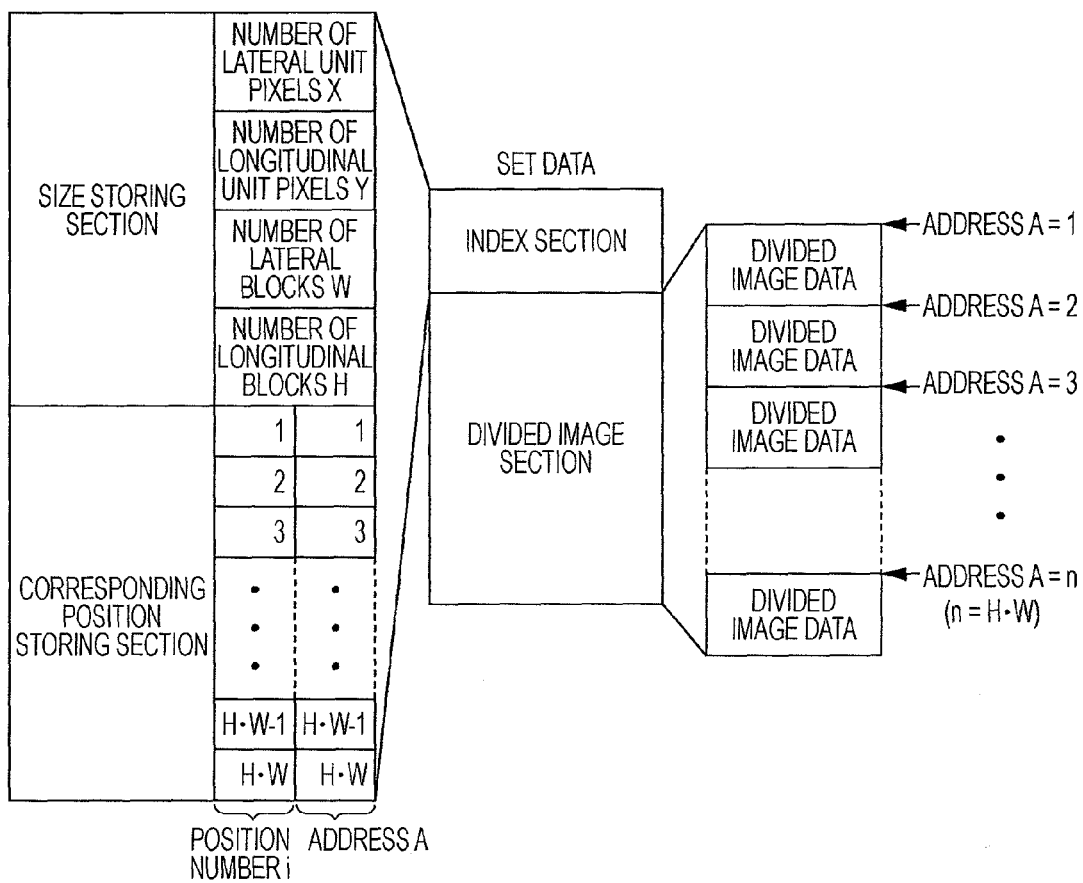
FIG. 4 is an explanatory view showing a data structure of a set file.

As shown in FIG. 4, the set file is made up of a divided image section and an index section.

The divided image section can store H×W pieces of divided image data that have been encoded. In the divided image section, the position of data is represented as an address A. By the use of values of 1 to n (n=H×W) of the address A, the position of each top data of H×W pieces of divided image data can be identified. When each piece of divided image data is stored in the divided image section, END information representing an end point is added to the end of the piece of divided image data. This enables one piece of divided image data having an arbitrary address to be read out by reading out, from the divided image section, data in the range from the top data identified by address A to the next END information.

The index section is made up of a size storing section and a corresponding position storing section. In the size storing section, the number of lateral unit pixels X, the number of longitudinal unit pixels Y, the number of lateral blocks W and the number of longitudinal blocks H mentioned above are stored. In the corresponding position storing section, a position number i that represents the position of divided image data in the original image and the address A of the divided image section are stored so as to correspond to each other. As shown in FIG. 3, the position number i is a number in the range from 1 to n that is assigned to divided image data in a given order from top left to bottom right, which is indicated by a dotted arrow, in the drawing when the original image data is divided into the divided image data. Accordingly, in the case where the position number i and the address A have the relationship shown in FIG. 4, for example, the divided image data at a position corresponding to the position number i=1 in the original image is stored at a position identified by the address A=1, which is the address A corresponding to the position number i=1, in the corresponding position storing section.

The operation of the multifunction printer 10 of this embodiment configured in such a manner is described below. In particular, reading image processing that stores image data read by the reading device 22 into the memory card 32 and printing image processing that prints image data stored in the memory card 32 by the printing device 20 are described below.

Figure 5B:
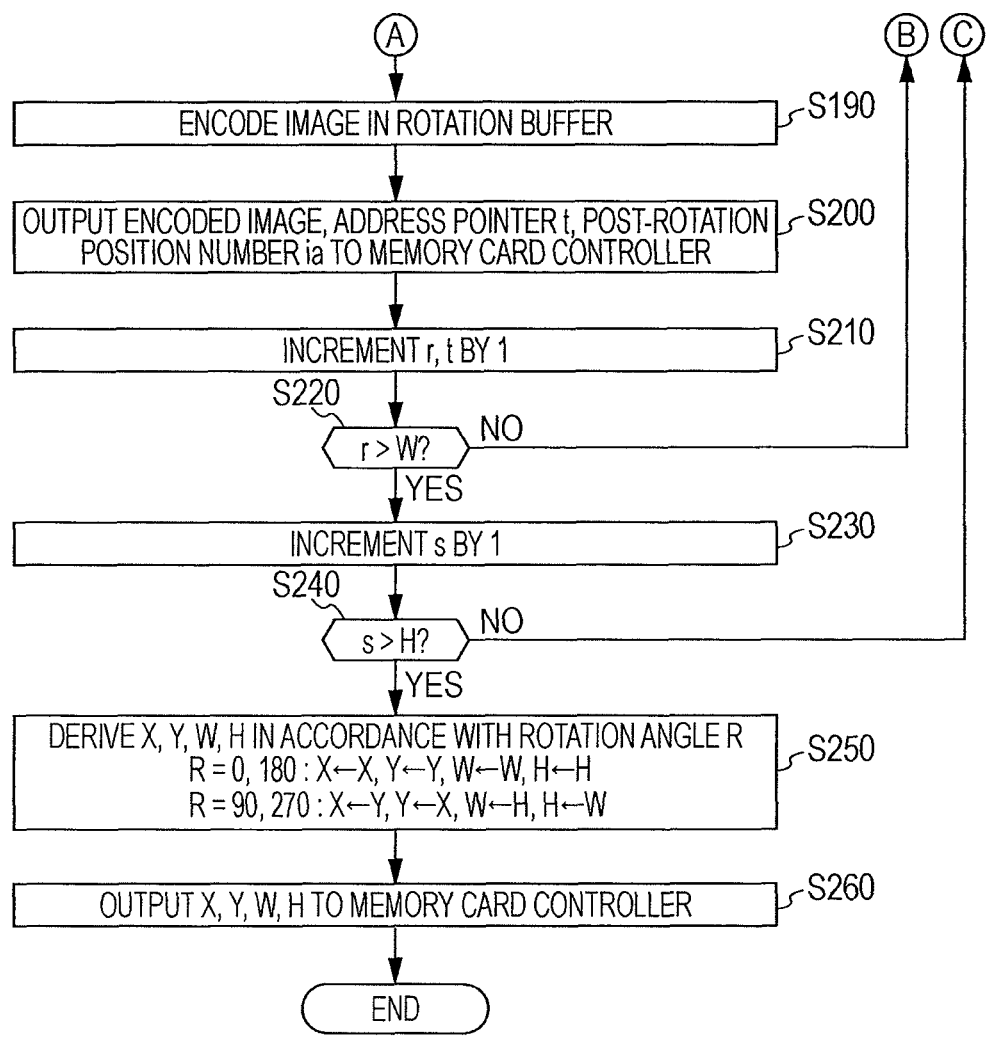
FIG. 5 is a flow chart showing an example of a reading image processing routine.

First, the reading image processing is described. FIG. 5 is a flow chart showing an example of a reading image processing routine. This routine is executed when a user operates the operation section 44 of the operation panel 40 to instruct that a document placed on the glass plate 36 should be read as image data.

During execution of this reading image processing routine, first, the CPU 60 acquires the number of lateral unit pixels X, the number of longitudinal unit pixels Y, the number of lateral blocks W, the number of longitudinal blocks H and the rotation angle R and stores them into the set-value buffer 82 of the RAM 80 (step S100). The rotation angle R as used herein refers to a value that represents an angle at which image data read by the reading device 22 is rotated clockwise so as to form image data to be stored. The rotation angle R has a value of any one of 0, 90, 180 and 270. A user should enter values of the number of lateral unit pixels X, the number of longitudinal unit pixels Y, the number of lateral blocks W, the number of longitudinal blocks H and the rotation angle R from the operation panel 40 during instruction of reading, and the CPU 60 acquires the entered values via the bus 94 and stores the values into the RAM 80.

Figure 6:
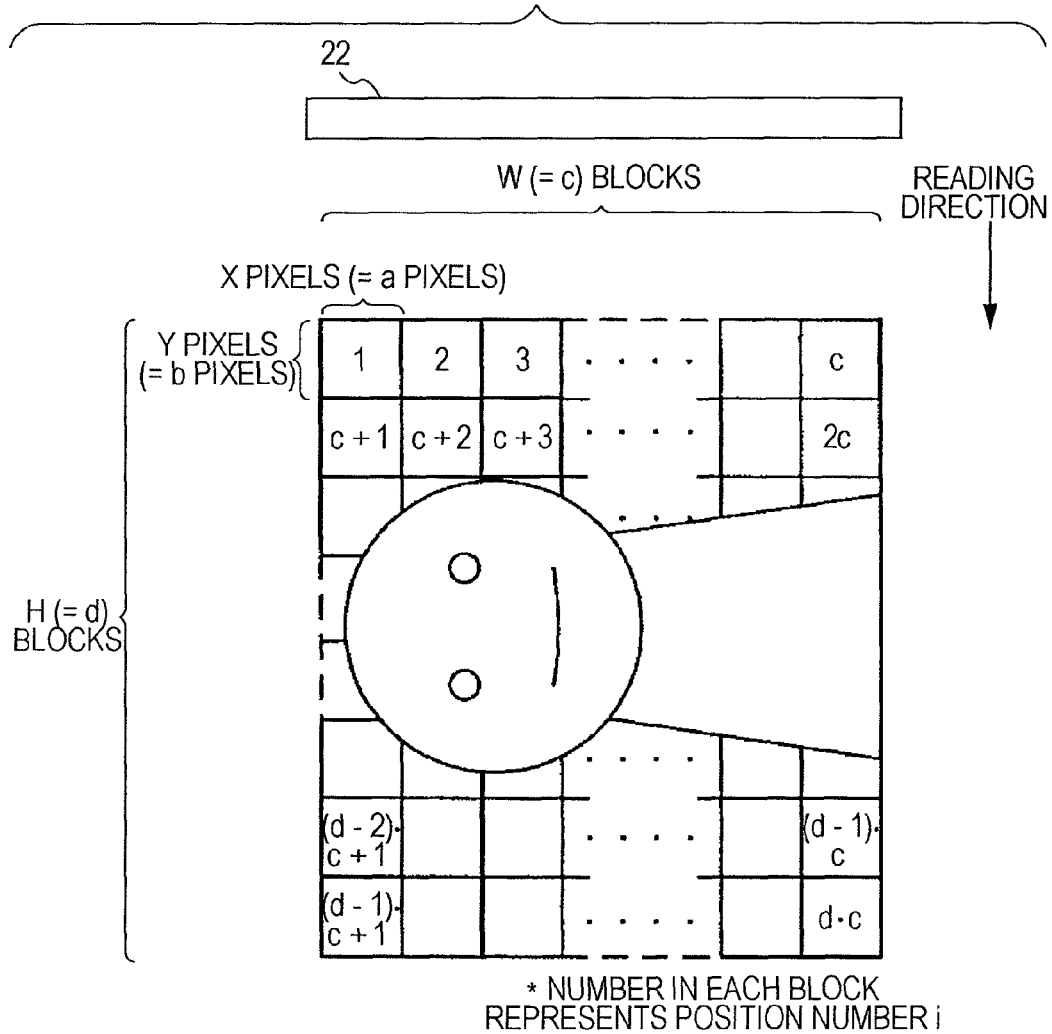
FIG. 6 is an explanatory view showing an example of original image data and divided image data.

Note that in the following description, it is assumed that an image placed on the glass plate 36 is the image shown in FIG. 6, and that a value of a is entered as the number of lateral unit pixels X, a value of b is entered as the number of longitudinal unit pixels Y, a value of c is entered as the number of lateral blocks W, a value of d is entered as the number of longitudinal blocks H, and a value of 90 is entered as the rotation angle R.

Next, the CPU 60 initializes, to a value of 1, a longitudinal pointer s that represents the position in the longitudinal direction of divided image data in the original image data and an address pointer t that represents an address for storing divided image data into the divided image section of a set file (step S110), and instructs the memory card controller 34 to prepare to store the set file (step S120). Thus, the memory card controller 34 creates a region for storing the set file in the memory card 32.

Subsequently, the CPU 60 instructs the reading device 22 to read a document placed on the glass plate 36 as image data (step S130). Thus, the reading device 22 performs processing of sequentially reading the document in the reading direction shown in FIG. 6 and storing the read data into the device buffer 84 of the RAM 80.

The CPU 60 determines whether the reading device 22 has completed reading of data corresponding to s blocks high×W blocks wide (step S140). If the determination is negative, then step S140 is repeated. Here, since the longitudinal pointer s is set to the value of 1, and the number of lateral blocks W is set to the value of c, it is determined whether reading of data corresponding to 1 block high×c blocks wide has been completed. This determination may be made, for example, by examining the amount of data stored in the device buffer 84. Alternatively, the CPU 60 may input from the reading device information indicating that reading has been completed.

If the determination is affirmative in step S140, then the CPU 60 initializes to a value of 1 a lateral pointer r that represents the position in the lateral direction of divided image data in the original image data (step S150), and reads out from the device buffer 84 image data corresponding to a block that is positioned rth in the lateral direction and sth in the longitudinal direction in the original image data and stores the image data as divided image data into the rotation buffer 86 (step S160). At this point, since both the pointers r and represent the value of 1, image data in the block positioned 1st in the lateral direction and 1st in the longitudinal direction, that is, the block with the position number i=1 in FIG. 6 is read out and is stored as divided image data into the rotation buffer 86.

Then, the divided image data stored into the rotation buffer 86 in step S160 is rotated exactly by the rotation angle R (step S170). At this point, since the value of the rotation angle R is 90, data obtained by rotating the divided image data of the block with the position number i=1 in FIG. 6 clockwise by 90 degrees is stored in the rotation buffer 86.

Figure 7:
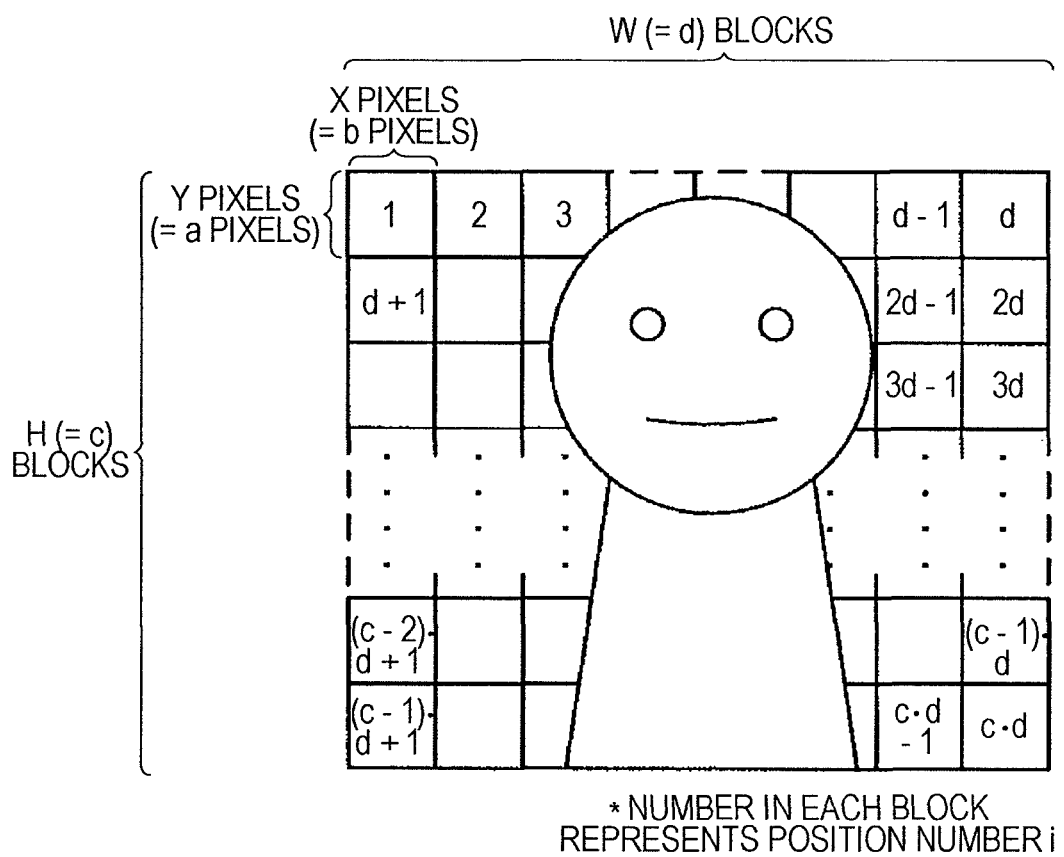
FIG. 7 is an explanatory view showing a state in which the original image data is rotated clockwise by 90 degrees.

Next, the position number i after rotation of the divided image data to which the process in step S170 has been applied is derived (step S180). Here, an image obtained by rotating the image of FIG. 6 clockwise by 90 degrees is shown in FIG. 7. As shown in FIG. 7, the value of the position number i in corresponding post-rotation divided image data of the image differs from that before rotation of the image. Note that for the purposes of explanation, the position number i before rotation is referred to also as a pre-rotation position number ib, and the position number i after rotation is referred to also as a post-rotation position number ia. For example, divided image data of the pre-rotation position number ib=1 (i.e., the position number i=1 in FIG. 6) needs to be stored as divided image data of the post-rotation position number ia=d (i.e., the position number i=d in FIG. 7) into a set file. The post-rotation position number ia can be derived by any one of the following expressions (1) to (4) in accordance with the value of the rotation angle R. At this point, since the rotation angle R is set to the value of 90, both the pointers r and s are set to the value of 1, and the number of longitudinal blocks H is set to the value of d, the value of d is obtained as the position number ia from expression (2). Note that expressions (1) to (4) are stored in the flash ROM 70.

$$\text{When } R=0: ia=(s-1)\times W+r \quad (1)$$

$$\text{When } R=90: ia=r\times H-s+1 \quad (2)$$

$$\text{When } R=180: ia=(H-s+1)\times W-r+1 \quad (3)$$

$$\text{When } R=270: ia=(W-r)\times H+s \quad (4)$$

Subsequently, the CPU 60 encodes the divided image data after rotation stored in the rotation buffer 86 using a JPEG scheme (step S190), and outputs the encoded divided image data, the address pointer t and the position number ia to the memory card controller 34 (step S200). Thus, the memory card controller 34 stores the position number ia and the address pointer t corresponding to each other in the corresponding position storing section of the index section in the storing region for the set file of the memory card 32, which has been created in step S120, and writes divided image data from the position identified by the address A=t of the divided image section and writes END information at the end. At this point, since the value of d as the position number ia and the value of 1 as the address pointer t are output from the CPU 60, the position number i=d and the address A=1 are stored so as to correspond to each other in the corresponding position storing section, and divided image data is written from the position of the address A=1.

After step S200, the CPU 60 increments the lateral pointer r and the address pointer t by one (step S210), and determines whether the lateral pointer r is greater than the number of lateral blocks W or not (step S220). If the determination is negative, then steps S160 to S220 are repeated. At this point, the lateral pointer r represents a value of 2, which results from the processing in step S210. If the value of c of the number of lateral blocks W is greater than the value of 2, then the determination is negative in step S220, and the process returns to step S160. That is, image data of a block that is positioned second in the lateral direction and first in the longitudinal direction in the original image data (a block with the position number i=2 in FIG. 6) is read out from the device buffer 84, and is stored as divided image data in the rotation buffer 86. The processing of steps S170 to S220 mentioned above is executed.

In this way, steps S160 to S220 are repeated c times, where c is a value of the number of lateral blocks W. In the cth processing of step S220, affirmative determination is made. Thus, the original image data of 1 block high×W (=c) blocks wide stored in the device buffer 84 in step S140 is read out as c pieces of divided image data of the pre-rotation position number ib (i.e., position number i in FIG. 6)=1, 2, 3, . . . , c, and is stored as c pieces of divided image data of the post-rotation position number ia (i.e., position number i in FIG. 7)=d, 2×d, 3×d, c×d, into a set file.

If the determination is affirmative in step S220, then the longitudinal pointer s is incremented by one (step S230), and it is determined whether the longitudinal pointer s is greater than the number of longitudinal blocks H or not (step S240). If the determination is negative, then steps S140 to S240 are repeated. At this point, steps S160 to S220 are repeated c times, the lateral pointer r represents a value of c+1, and the longitudinal pointer s represents a value of 2, which results from step S230. Therefore, if the value of d of the number of longitudinal blocks H is greater than 2, then the determination is negative in step S240, and the process returns to step S140. That is, in step S140, it is determined whether the reading device 22 has completed reading of data corresponding to 2 blocks high×W blocks wide. If the determination is affirmative, then in step S150, the lateral pointer r is initialized to a value of 1, and steps S160 to 220 are repeated c times. Thus, c pieces of divided image data of the pre-rotation position number ib (i.e., position number i in FIG. 6)=c+1, c+2, c+3, . . . , 2×c, are stored as c pieces of divided image data of the post-rotation position number ia (i.e., position number i in FIG. 7)=d−1, 2×d−1, 3×d−1, . . . , c×d−1, into a set file. Steps S140 to S240 are repeated d times, where d is the value of the number of longitudinal blocks H. After all the divided image data of the position number i=1, 2, . . . , d×c is stored into a set file, affirmative determination is made in step S240.

If the determination is affirmative in step S240, then the post-rotation values of the numbers of unit pixels X and Y and the numbers of blocks W and H are derived in accordance with the value of the rotation angle R (step S250). As shown in FIG. 7, as the orientation of an image is changed, the values of the numbers of unit pixels X and Y and the numbers of blocks W and H in image data are also changed. The values after change need to be derived. In step S250, when the rotation angle R has a value 0 or 180, the post-rotation values of the numbers of unit pixels X and Y and the numbers of blocks W and H are the same as those acquired in step S100. When the rotation angle R has a value of 90 or 270, the values of the numbers of unit pixels X and Y acquired in step S100 are replaced with each other to obtain the post-rotation values of the numbers of unit pixels X and Y, and the values of the numbers of blocks W and H acquired in step S100 are replaced with each other to obtain the post-rotation values of the numbers of blocks W and H. At this point, since the rotation angle R has a value of 90, the post-rotation value of the number of lateral unit pixels X is b, the post-rotation value of the number of longitudinal unit pixels Y is a, the post-rotation value of the number of lateral blocks W is d, and the post-rotation value of the number of longitudinal blocks H is c.

After step S250, the derived post-rotation values of the numbers of unit pixels X and Y and the numbers of blocks W and H are output to the memory card controller 34 (step S260), and this routine ends. Thus, the memory card controller 34 stores the post-rotation values of the numbers of unit pixels X and Y and the numbers of blocks W and H into the index section in the storing region for the set file of the memory card 32.

Figure 8:
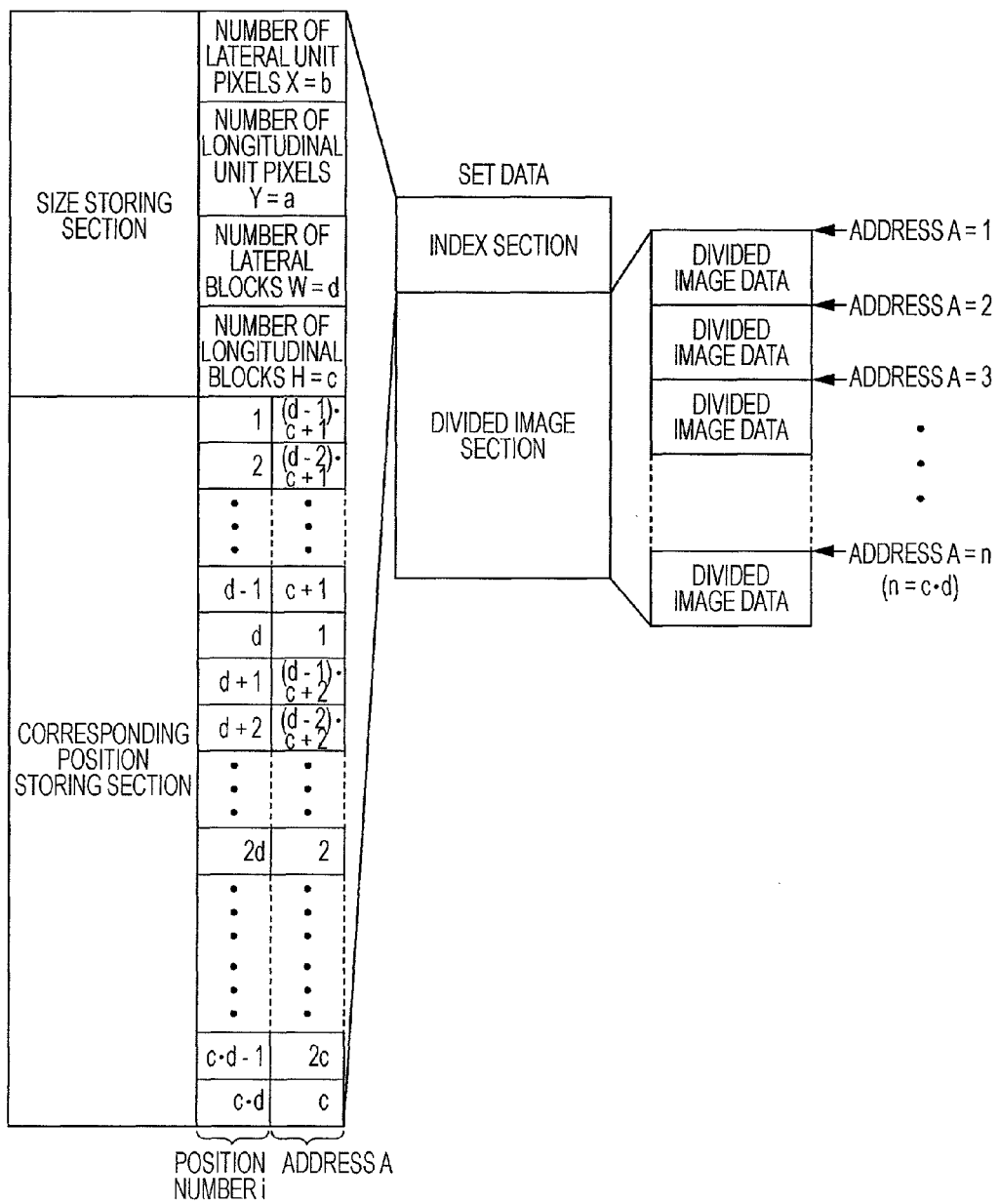
FIG. 8 is an explanatory view showing a set file with the original image data rotated clockwise by 90 degrees.

As described above, when the reading image processing routine ends, a set file as shown in FIG. 8 is created in the memory card 32. In this set file, the position number i after rotation and the address A that represents the position for storing post-rotation divided image data are stored in the corresponding position storing section such that they correspond to each other. Therefore, if the divided image data is arranged in order from top left in accordance with the value of the position number i, post-rotation image data shown in FIG. 7 is obtained.

Figure 9:
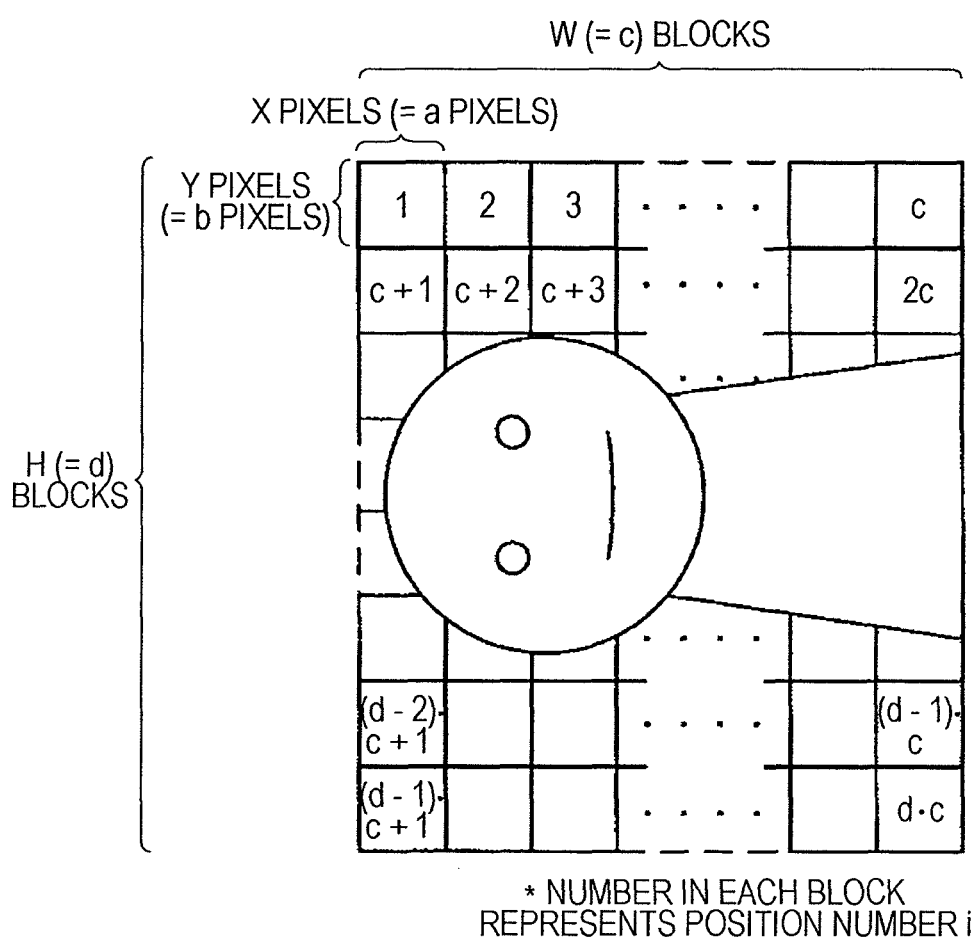
FIG. 9 is an explanatory view showing a state in which the original image data is rotated clockwise by 0 degrees.
Figure 10:
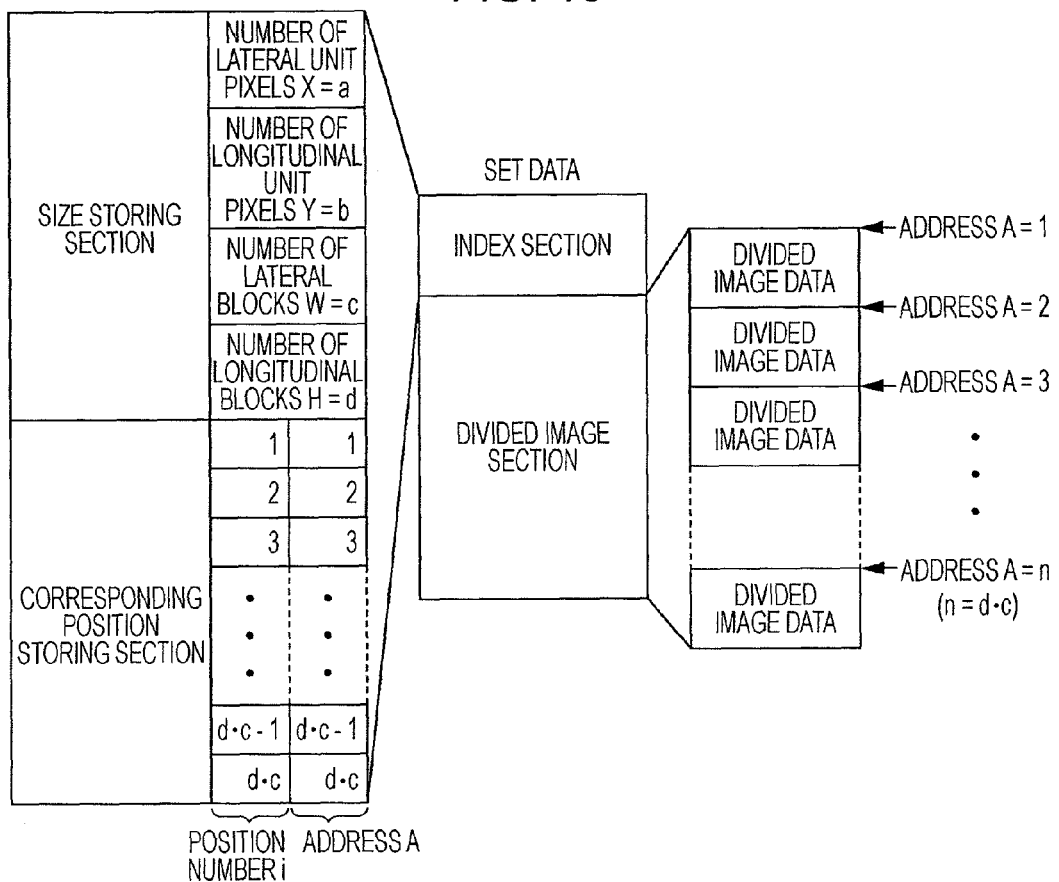
FIG. 10 is an explanatory view showing a set file with the original image data rotated clockwise by 0 degrees.
Figure 11:
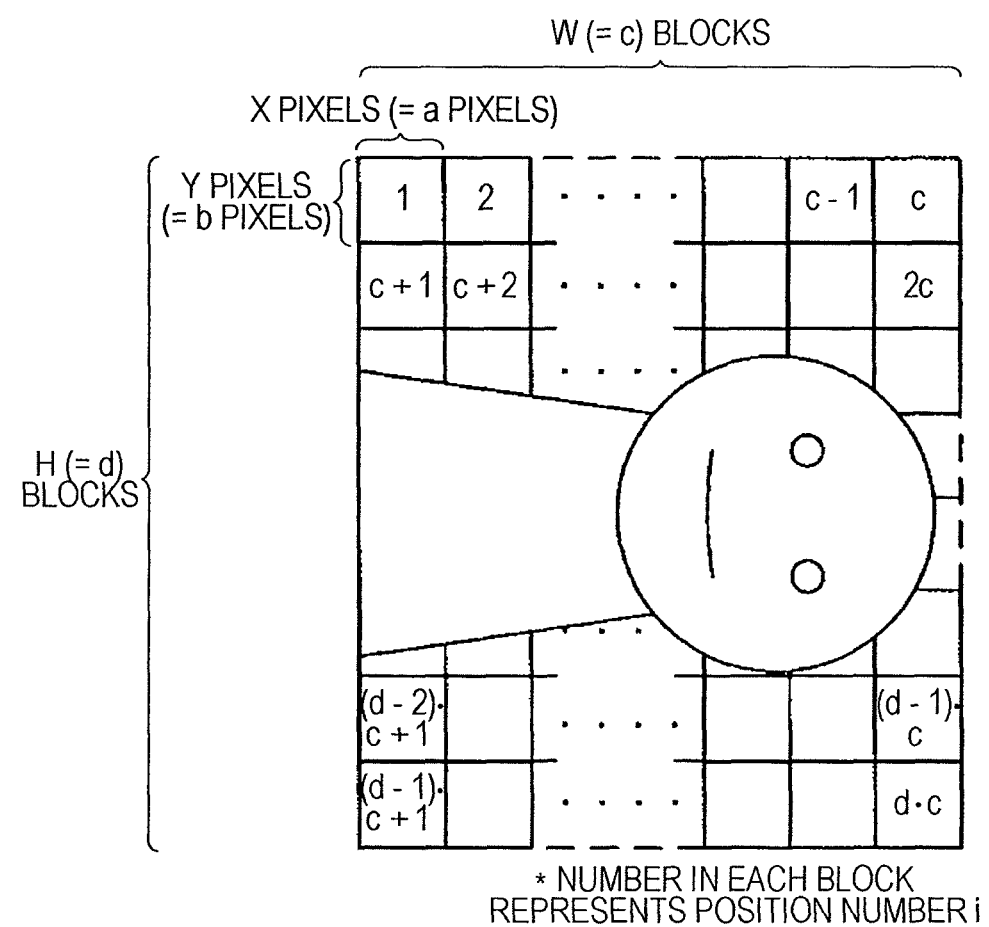
FIG. 11 is an explanatory view showing a state in which the original image data is rotated clockwise by 180 degrees.
Figure 12:
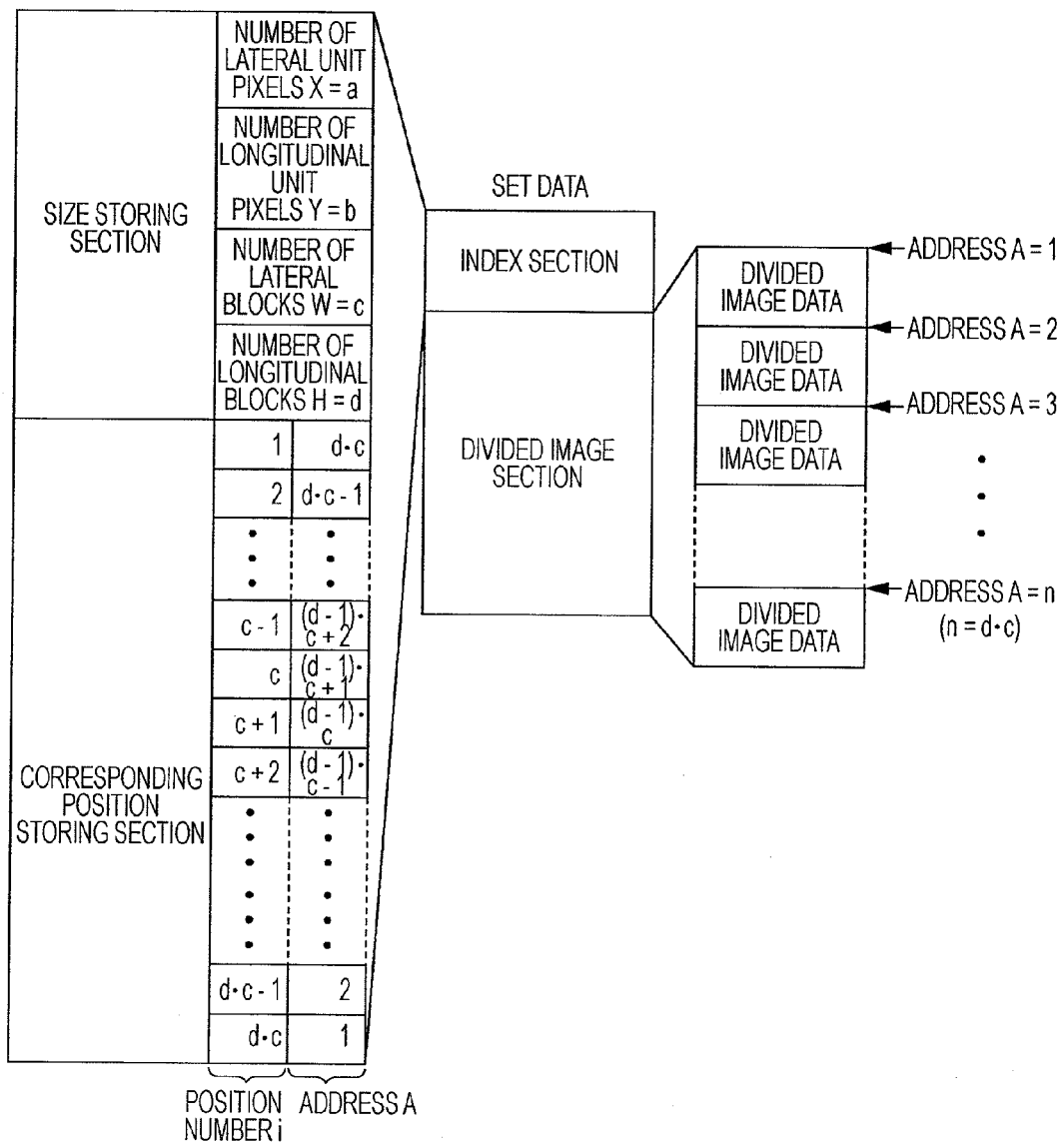
FIG. 12 is an explanatory view showing a set file with the original image data rotated clockwise by 180 degrees.
Figure 13:
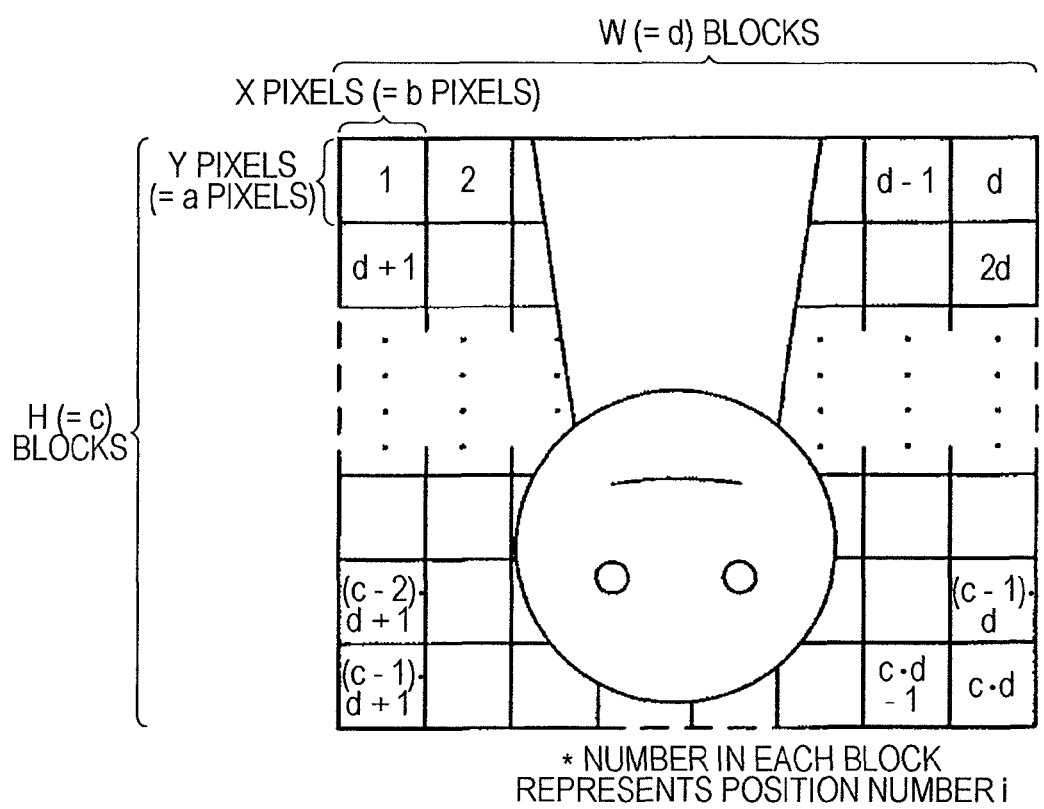
FIG. 13 is an explanatory view showing a state in which the original image data is rotated clockwise by 270 degrees.
Figure 14:
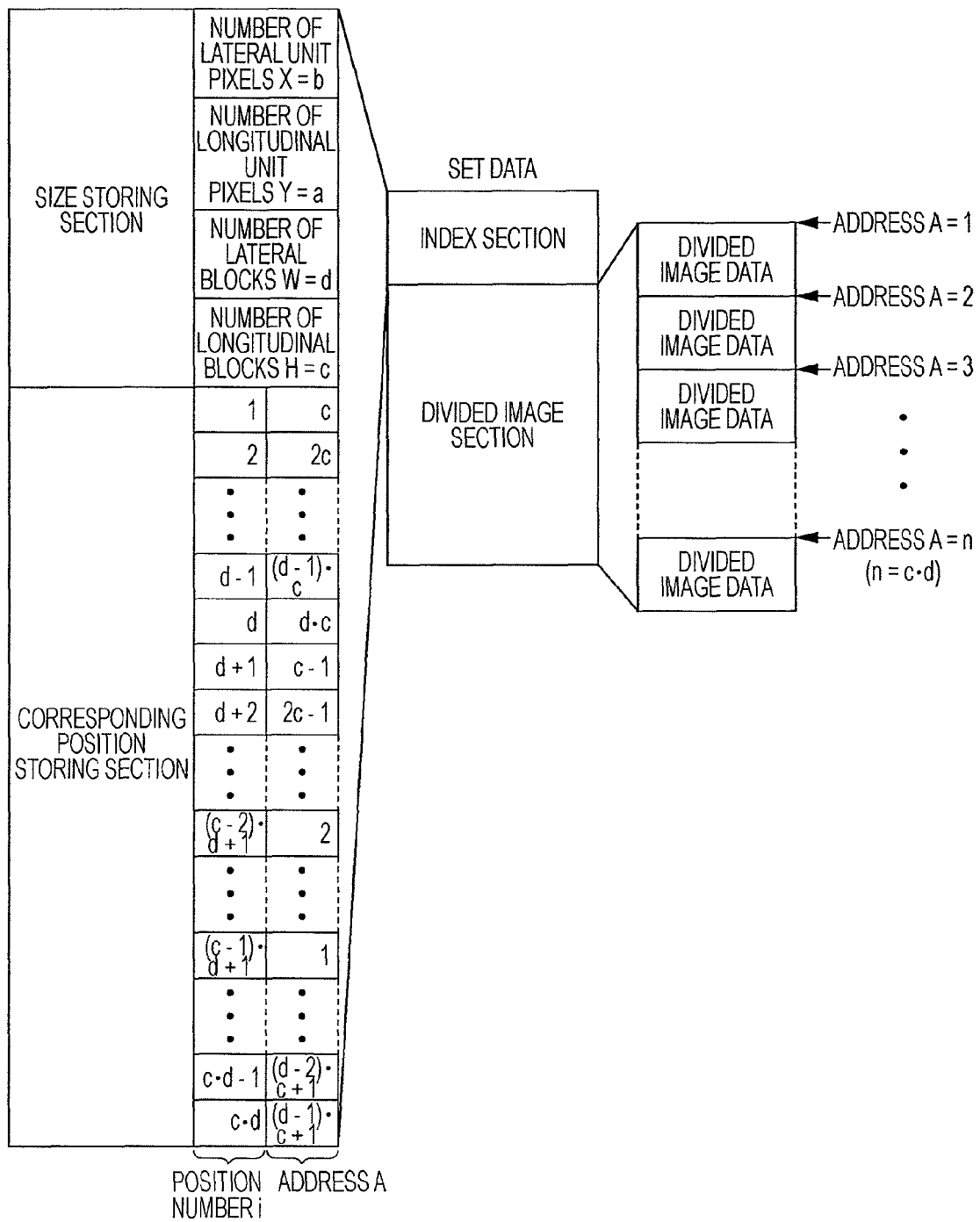
FIG. 14 is an explanatory view showing a set file with the original image data rotated clockwise by 270 degrees.

Note that the rotation angle R is exemplified as a value of 90 in the foregoing description. However, if the rotation angle R has a value of 0, 180 or 270, a set file in which the position number i after rotation and the address A that represents the position for storing post-rotation divided image data correspond to each other can also be created similarly by executing a reading image processing routine. Post-rotation image data and its set file when the rotation angle R has a value of 0 are shown in FIGS. 9 and 10, post-rotation image data and its set file when the rotation angle R has a value of 180 are shown in FIGS. 11 and 12, and post-rotation image data and its set file when the rotation angle R has a value of 270 are shown in FIGS. 13 and 14.

Figure 15:
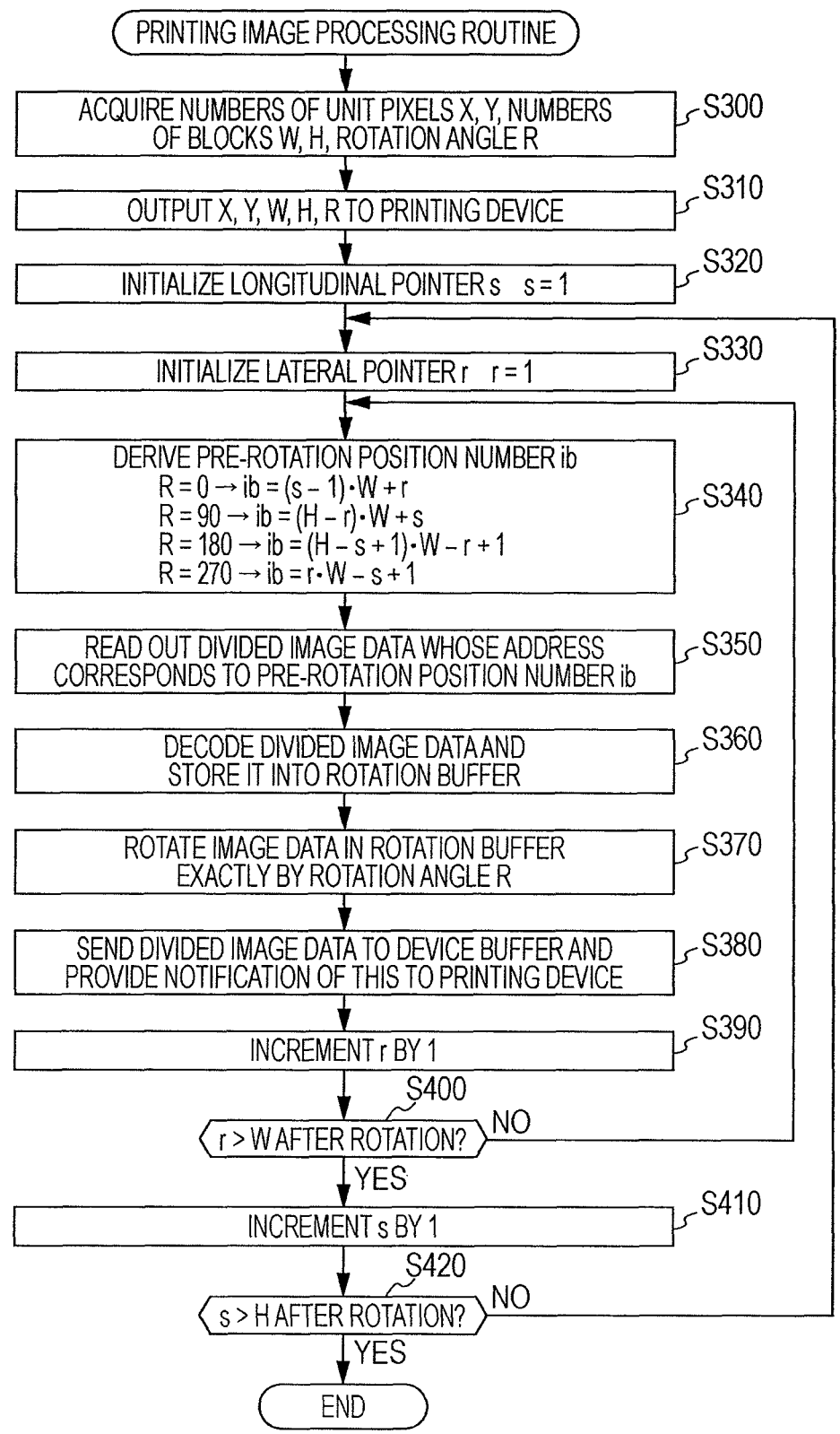
FIG. 15 is a flow chart showing an example of a printing image processing routine.

Printing image processing to print image data stored in the memory card 32 by the printing device 20 is now described. FIG. 15 is a flow chart showing an example of a printing image processing routine. This routine is executed when a user operates the operation section 44 of the operation panel 40 to instruct that image data in a set file stored in the memory card 32 should be printed.

During execution of this printing image processing routine, first, the CPU 60 acquires values of the number of lateral unit pixels X, the number of longitudinal unit pixels Y, the number of lateral blocks W, and the number of longitudinal blocks H via the memory card controller 34 and also acquires the value of the rotation angle R that is entered from the operation panel 40 by the user when the user gives instructions for printing, and stores each acquired value into the set-value buffer 82 of the RAM 80 (step S300).

Note that in the following description, it is assumed that the set file for which the user gives instructions for printing is a set file shown in FIG. 10 (i.e., the image data shown in FIG. 9), and the rotation angle R has a value of 90.

Next, the CPU 60 outputs values of the number of lateral unit pixels X, the number of longitudinal unit pixels Y, the number of lateral blocks W, the number of longitudinal blocks H and the rotation angle R stored in the set-value buffer 82 to the printing device 20 (step S310). That is, the value of a as the number of lateral unit pixels X, the value of b as the number of longitudinal unit pixels Y, the value of c as the number of lateral blocks W, the value of d as the number of longitudinal blocks H, and a value of 90 as the rotation angle R are output to the printing device 20.

Subsequently, the CPU 60 initializes the longitudinal pointer s to a value of 1 (step S320) and the lateral pointer r to a value of 1 (step S330). Then, the pre-rotation position number ib of a block that corresponds to the values of pointers r and s of the post-rotation image data is derived (step S340).

Here, when the image data shown in FIG. 9 is rotated clockwise by 90 degrees, the image shown in FIG. 7 appears. The printing device 20 prints image data from top toward bottom in order onto a sheet of recording paper S, and therefore divided image data needs to be output to the printing device 20 in the order of the post-rotation position number ia (i.e., the position number i in FIG. 7), not in the order of the pre-rotation position number ib (i.e., the position number i in FIG. 9). Accordingly, the pre-rotation position number ib corresponding to the post-rotation position number ia should be derived.

The pre-rotation position number ib can be derived by any one of the following expressions (5) to (8) in accordance with the value of the rotation angle R. At this point, since the rotation angle R has a value of 90, both the pointers r and s have a value of 1, the number of lateral blocks W has a value of c, and the number of longitudinal blocks H has a value of d, a value of $(d-1) \times c+1$ is obtained as the pre-rotation position number ib from expression (6). Consequently, it is found that the value of the pre-rotation position number ib corresponding to the block where both the pointers r and s have a value of 1 (i.e., the post-rotation position number ia=1) is $(d-1) \times c+1$. Note that expressions (5) to (8) are stored in the flash ROM 70.

When $R=0$: $ib=(s-1) \times W+r$ (5)

When $R=90$: $ib=(H-r) \times W+s$ (6)

When $R=180$: $ib=(H-s+1) \times W-r+1$ (7)

When $R=270$: $ib=r \times W-s+1$ (8)

Then, the CPU 60 reads out divided image data whose address corresponds to the pre-rotation position number ib derived in step S340 from a set file (step S350), and decodes the read-out divided image data using a JPEG scheme and stores it into the rotation buffer 86 (step S360). At this point, since the pre-rotation position number ib derived in step S340 has a value of $(d-1) \times c+1$ and the address A that corresponds to the position number $i=(d-1) \times c+1$ in the corresponding position storing section of the set file shown in FIG. 10 has the value of $(d-1) \times c+1$, divided image data in the range from the address $A=(d-1) \times c+1$ to END information in the divided image section is read out, is decoded, and is stored into the rotation buffer 86.

Subsequently, the CPU 60 rotates the divided image data stored into the rotation buffer 86 in step S360 exactly by the rotation angle R (step S370). At this point, since the value of the rotation angle R is 90, the divided image data of the pre-rotation position number ib that has been stored in the rotation buffer 86, that is, the divided image data of the block with the position number $i=(d-1) \times c+1$ in FIG. 9 is rotated clockwise by 90 degrees, thereby obtaining data. The resultant data is stored into the rotation buffer 86. Then, the CPU 60 stores the post-rotation divided image data into the device buffer 84 and provides notification of this to the printing device 20 (step S380), and increments the lateral pointer r by one (step S390).

Subsequently, the CPU 60 determines whether the lateral pointer r is greater then the number of lateral blocks W after rotation or not (step S400). Here, the number of lateral blocks W after rotation can be obtained in accordance with the value of the rotation angle R in the same way as in step S250 of the foregoing reading image processing routine. At this point, since the rotation angle R has a value of 90, the post-rotation value of the number of lateral blocks W is the same as the pre-rotation value of the number of longitudinal blocks H, that is, the value of d. Therefore, it is determined whether the value of 2 of the lateral pointer r is greater than the value of d or not.

If the value of d, that is, the post-rotation value of the number of lateral blocks W is greater than the value of 2, then the determination is negative in step S400, and steps S340 to S400 are repeated. Thus, steps S340 to S400 are repeated d times, where d is a value of the number of lateral blocks W. In dth processing of step S400, affirmative determination is made. By the d repetitions of processing, d pieces of divided image data of the pre-rotation position number ib (i.e., the position number i in FIG. 9)=$(d-1) \times c+1$, $(d-2) \times c+1$, ..., 1 that correspond to d pieces of divided image data of the post-rotation position number ia (i.e., the position number i in FIG. 7)=1, 2, ..., d are read out from a set file, and are stored in turns into the device buffer 84.

If the determination is affirmative in step S400, then the longitudinal pointer s is incremented by one (step S410), and it is determined whether the longitudinal pointer s is greater than the post-rotation value of the number of longitudinal blocks H or not (step S420). The number of longitudinal blocks H after rotation can also be obtained in accordance with the value of the rotation angle R in the same way as in step S250 of the foregoing reading image processing routine. At this point, since the rotation angle R has a value of 90, the number of longitudinal blocks H after rotation has the same value as the number of lateral blocks W before rotation, that is, the value of c. Therefore, it is determined whether the value of 2 of the longitudinal pointer s is greater than the value of c or not.

If the value of c, that is, the post-rotation value of the number of longitudinal blocks H is greater than the value of 2, then the determination is negative in step S420, and steps S330 to S400 are repeated. Thus, steps S330 to S400 are repeated c times, where c is a value of the number of longitudinal blocks H. When affirmative determination is made in cth processing of step S400, this routine is terminated. By the c repetitions of processing, divided image data that corresponds to all blocks of the post-rotation position number ia (i.e., the position number i in FIG. 7)=1, 2, ..., d×c is read out just in the order of the post-rotation position number ia from a set file, and is stored into the device buffer 84.

On the other hand, the printing device 20 can grasp the whole size of image data to be printed and the arrangement of divided image data in image data based on values of the number of lateral unit pixels X, the number of longitudinal unit pixels Y, the number of lateral blocks W, the number of longitudinal blocks H and the rotation angle R that are output in step S310. Therefore, the printing device 20 can print image data in order from top toward bottom onto a sheet of recording paper S based on divided image data stored in the device buffer 84 every time notification of step S380 is provided. As a result, the image of FIG. 7, which is the image obtained by rotating the image data shown in FIG. 9 by 90 degrees, is printed on a sheet of the recording paper S.

Note that the rotation angle R is exemplified as a value of 90 in the foregoing description. However, if the rotation angle R has a value of 0, 180 or 270, divided image data can be read out and printed just in the order of the post-rotation position number ia from a set file similarly by executing a printing image processing routine. When rotation angle R has values of 0, 180 and 270, the images shown in FIGS. 9, 11 and 13 are printed on sheets of the recording paper S, respectively.

Here, the corresponding relationship between elements of this embodiment and elements of the invention is clarified.

The memory card 32 of this embodiment corresponds to a pre-rotation encoded data pair storing unit; the flash ROM 70 corresponds to a positional relationship storing unit; the CPU 60 corresponds to a post-rotation data pair creating unit, a pre-rotation data pair creating unit, a post-rotation data pair creating unit, a dividing unit, an encoding unit, and an encoded data pair set creating unit; the printing device 20 corresponds to an image creating unit; and the reading device 22 corresponds to an acquiring unit.

According to the embodiment described above in detail, in the reading image processing and the printing image processing, if the rotation buffer 86 has a capacity for holding one piece of divided image data, rotation processing can be performed for every piece of divided image data that is obtained by dividing image data. This means that the required capacity of the rotation buffer 86 is smaller than that in the case of rotating the whole image data.

In the printing image processing, divided image data is read out just in the order of the post-rotation position information ia from a set file. Therefore, the rotating of the read-out divided image data and the printing of the post-rotation divided image data can be performed as pipeline processing. This enables the whole processing to be performed in a shorter time.

In the reading image processing, divided image data can be created sequentially from the device buffer 84 without waiting until the reading device 22 has read all the image data. Therefore, processing of reading image data by the reading device 22 and processing of creating a set file by repeating steps S140 to S240 of the reading image processing routine can be performed as pipeline processing. This enables the whole processing to be performed in a shorter time.

Image data is divided and is stored in the format of a set file into the memory card 32, and therefore the original image data can be obtained by arranging divided image data in the divided image section using information stored in the corresponding position storing section and the size storing section. Even if image data obtained by rotating the original image data is desired, divided image data may be individually rotated and then arranged in the post-rotation position using information stored in the corresponding position storing section and the size storing section. Only a buffer configured to hold one piece of divided image data is required for processing during rotation. The required capacity of a buffer is smaller than that in the case of rotating the whole object image data.

Note that it is to be understood that the invention is not limited to the aforementioned embodiment, and can be implemented in various embodiments within the technical scope of the invention.

For example, while the position number i is the number assigned in order from top left to bottom right of divided image data in the aforementioned embodiment, any position information may be used if it can represent the position of divided image data in image data. For example, the position number i may be assigned clockwise in order from outer divided image data toward inner divided image data of image data. For example, assuming that the lateral direction of image data is the x axis and the longitudinal direction is the y axis, the position of divided image data may be represented by coordinates of x and y. In this way, the position of divided image data can be represented without the use of the number of lateral blocks W and the number of longitudinal blocks H.

In the aforementioned embodiment, divided image data and information representing the position of the divided image data are stored in the format of a set file including the index section and the divided image section. However, they may be stored in another format. For example, in the foregoing case of representing the position of divided image data by xy coordinates, a set file may be a set of data pairs in which divided image data and xy coordinates correspond to each other. In this way, the original image data can be obtained by arranging each piece of divided image data at a position of the corresponding xy coordinates, without the size storing section and the corresponding position storing section. In this case, when rotation is performed, post-rotation xy coordinates may be derived from pre-rotation xy coordinates.

In the aforementioned embodiment, the position of top data of divided image data can be identified by the use of values of 1, 2, 3, ..., n of the address A in the divided image section. However, the address A may have other values, and may specify the position in the divided image section in bits or in bytes. For example, in the case of specifying in bytes, if the divided image data identified by the address A=0 is 10 KB, the next address A has a value of 10. If the divided image data identified by the address A=10 is 15 KB, the next address A has a value of 25. As such, the value of the address A may be determined in accordance with the amount of data of the divided image data. Further, divided image data may be identified by an identification number assigned to the divided image data, not by the address. In this case, the divided image data and the identification number should be stored in the divided image section such that the divided image data and the identification number correspond to each other, and the position number i and the identification number should be stored in the corresponding position storing section such that the position number i and the identification number correspond to each other.

In the aforementioned embodiment, description has been given assuming that the original image data has a size that is an integral multiple of a size of the divided image data of X pixels wide and Y pixels high. For example, as in the case where the original image data is 2000 pixels wide×3000 pixels high and the divided image data is 64 pixels wide×64 pixels high, the size of the original image data may not be an integral multiple of that of the divided image data.

Figure 16:
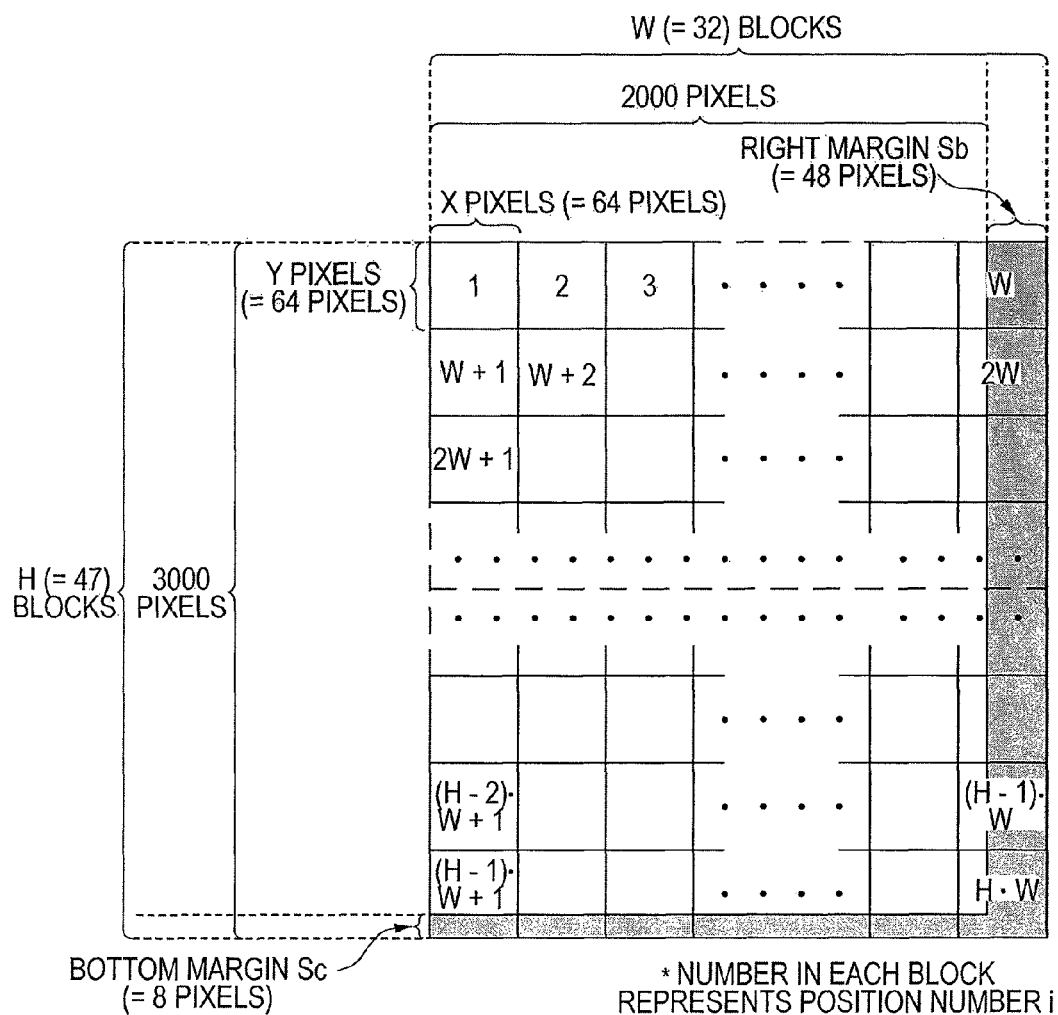
FIG. 16 is an explanatory view showing a state in which the size of original image data is not an integral multiple of a size of divided image data.

In such a case, a top margin Sa, a right margin Sb, a bottom margin Sc and a left margin Sd may be used as the values representing portions without the original image data. In the foregoing case, as shown in FIG. 16, the number of lateral blocks W has a value of 32, the number of longitudinal blocks H has a value of 47, the top margin Sa has a value of 0, the right margin Sb has a value of 48, the bottom margin Sc has a value of 8, and the left margin Sd has a value of 0. In this way, in reading out divided image data from the original image data (step S160 in the reading image processing routine), whether the divided image data includes a margin or not is determined from the value of the position number i and the values of the margins Sa, Sb, Sc and Sd. If the divided image data includes a margin, then the divided image data can be read out as a block excluding the margin (e.g., a block 16 pixels wide×64 pixels high in the case of a block with the position number i=W), not as a block 64 pixels wide×64 pixels high.

Also, in reading out divided image data from the original image data, divided image data can be read out as a block 64 pixels wide×64 pixels high assuming that there is image data of a NULL value or a white color.

Further, in step S250 in the reading image processing routine, the margins Sa, Sb, Sc and Sd obtained after rotation in accordance with the value of the rotation angle R may be derived and stored in the size storing section of a set file. Specifically, when the rotation angle R has a value of 0, the margins Sa, Sb, Sc and Sd may be stored without being changed as post-rotation values. When the rotation angle R has a value of 90, the top margin Sa after rotation may have the same value as the left margin Sd before rotation, the right margin Sb after rotation may have the same value as the top margin Sa before rotation, the bottom margin Sc after rotation may have the same value as the right margin Sb before rotation, and the left margin Sd after rotation may have the same value as the bottom margin Sc before rotation. When the rotation angle R has a value of 180, the top margin Sa after rotation may have the same value as the bottom margin Sc before rotation, the right margin Sb after rotation may have the same value as the left margin Sd before rotation, the bottom margin Sc after rotation may have the same value as the top margin Sa before rotation, and the left margin Sd after rotation may have the same value as the right margin Sb before rotation. When the rotation angle R has a value of 270, the top margin Sa after rotation may have may have the same value as the right margin Sb before rotation, the right margin Sb after rotation may have the same value as the bottom margin Sc before rotation, the bottom margin Sc after rotation may have the same value as the left margin Sd before rotation, and the left margin Sd after rotation may have the same value as the top margin Sa before rotation. In this way, the margins Sa, Sb, Sc and Sd after rotation are stored into the size storing section. This makes it possible that when divided image data that has been decoded is stored into a rotation buffer in step S360 of the printing image processing routine, whether the divided image data includes a margin or not is determined from the value of the position number i and the values of the margins Sa, Sb, Sc and Sd. If the divided image data includes a margin, then the divided image data can be stored as a block excluding the margin (e.g., a block 16 pixels wide×64 pixels high in the case of a block with the position number i=W), not as a block 64 pixels wide×64 pixels high, into the rotation buffer.

In the aforementioned embodiment, in step S100 of the reading image processing routine, the values of the number of lateral unit pixels X, the number of longitudinal unit pixels Y, the number of lateral blocks W, the number of longitudinal blocks H and the rotation angle R that a user has entered are acquired and are stored into the set-value buffer 82 by the CPU 60. However, they may be set in advance in the set-value buffer 82. Alternatively, a user may set the rotation angle R only, and the CPU 60 may set the number of lateral unit pixels X, the number of longitudinal unit pixels Y, the number of lateral blocks W and the number of longitudinal blocks H in accordance with the size of a document to be read. The size of the document to be read may be detected by a sensor for detecting the size of a document on the glass plate 36, and may also be specified by a user.

In the aforementioned embodiment, a description of the multifunction printer 10 having two functions has been given. One of the functions is a function of creating divided image data from image data acquired by reading an image by the reading device 22, and creating a set file. The other is a function of reading out divided image data from a set file and printing it on a sheet of the recording paper S. However, a scanner or a printer having only one of both the functions may be provided. Moreover, an image processing apparatus that decodes one piece of image data created and encoded using a JPEG scheme by another scanner or a digital camera, and divides, rotates and encodes again the decoded image data to create a set file may be provided. An image processing apparatus that reads out divided image data from a set file and rotates it exactly by the rotation angle R to display an image on a display may be provided.

In the aforementioned embodiment, divided image data is encoded and decoded using a JPEG scheme. However, divided image data may be encoded and decoded using another scheme.

What is claimed is:

1. An image processing apparatus, comprising:
a pre-rotation encoded data pair storing unit that stores a set of pre-rotation encoded data pairs including:
a plurality of pieces of pre-rotation encoded data that are data obtained by dividing object image data into a plurality of pieces of divided image data and individually encoding each of the plurality of pieces of divided image data; and
pre-rotation position information that represents a position of the pre-rotation encoded data in the object image data,
wherein the plurality of pieces of pre-rotation encoded data and the pre-rotation position information correspond to each other;
a positional relationship storing unit that stores a relationship between the pre-rotation position information and post-rotation position information representing a position when the position represented by the pre-rotation position information has been rotated exactly by a given angle;
a post-rotation data pair creating unit that sequentially reads out the pre-rotation encoded data pairs stored in the pre-rotation encoded data pair storing unit, decodes the pre-rotation encoded data included in the pre-rotation encoded data pairs into divided image data, and creates a plurality of post-rotation data pairs each including post-rotation divided image data obtained by rotating the decoded divided image data exactly by the given angle, and post-rotation position information associated with the pre-rotation position information included in the pre-rotation encoded data pair, wherein the divided image data after rotation and the post-rotation position information correspond to each other; and
an image creating unit that arranges, for the plurality of post-rotation data pairs, the post-rotation divided image data included in each of the post-rotation data pairs at a position identified by the post-rotation position information included in the post-rotation data pair to create a post-rotation object image that is an image obtained by rotating the object image data exactly by the given angle,
wherein the post-rotation data pair creating unit is a unit that reads out the pre-rotation encoded data pairs in a given order specified by the post-rotation position information associated with the pre-rotation position information included in the pre-rotation encoded data pairs when sequentially reading out the pre-rotation encoded data pairs stored in the pre-rotation encoded data pair storing unit; and
the image creating unit is a unit that arranges the post-rotation divided image data in the given order when creating the post-rotation object image from the plurality of post-rotation data pairs, and
wherein the divided image data includes margin data, and the margin data is excluded when reading out the pre-rotation encoded data corresponding to the divided image data that includes the margin data.

2. An image processing apparatus, comprising:
an acquiring unit that acquires object image data;
a pre-rotation data pair creating unit that divides the object image data to create a plurality of pieces of divided image data, and creates a pre-rotation data pair including the divided image data and pre-rotation position information that represents a position of the divided image data in the object image data, wherein the divided image data and the pre-rotation position information correspond to each other;

a positional relationship storing unit that stores a relationship between the pre-rotation position information and post-rotation position information that represents a position when the position represented by the pre-rotation position information has been rotated exactly by a given angle; and a post-rotation encoded data pair set creating unit that sequentially creates encoded data obtained by rotating the divided image data included in the pre-rotation data pair exactly by the given angle and encoding the rotated divided image data to create a set of post-rotation encoded data pairs each including the encoded data and the post-rotation position information associated with the pre-rotation position information included in the pre-rotation data pair, wherein the encoded data and the post-rotation position information correspond to each other, wherein even when the acquiring unit is acquiring the object image data, the pre-rotation data pair creating unit sequentially creates the divided image data from a first partial object image data that is part of the acquired object image data simultaneously while the acquiring unit is acquiring, from outside of the image processing apparatus, a second partial object image data that is part of the acquired object image data to allow the pre-rotation data pair including the divided image data and the pre-rotation position information corresponding to each other to be sequentially created.

3. An image processing apparatus, comprising:
an acquiring unit that acquires object image data;
a dividing unit that creates a plurality of pieces of divided image data into which the object image data is divided;
an encoding unit that creates encoded data obtained by encoding the divided image data; and
an encoded data pair set creating unit that creates a set of encoded data pairs each including the encoded data and position information that represents a position of the encoded data in the object image data, wherein the encoded data and the position information correspond to each other, wherein even when the acquiring unit is acquiring the object image data, the dividing unit sequentially creates the divided image data from a first partial object image data that is part of the acquired object image data simultaneously while the acquiring unit is acquiring, from outside of the image processing apparatus, a second partial object image data that is part of the acquired object image data to allow the encoded data pair including the encoded data and the position information corresponding to each other to be sequentially created.

4. The image processing apparatus of claim 1, wherein the margin data is excluded from the pre-rotation encoded data stored in the pre-rotation encoded data pair storing unit.

5. The image processing apparatus of claim 2, wherein the divided image data includes margin data, and the post-rotation encoded data pair set creating unit excludes the margin data when creating the encoded data corresponding to the divided image data that includes the margin data.

6. The image processing apparatus of claim 3, wherein the divided image data includes margin data, and the encoding unit excludes the margin data when creating the encoded data corresponding to the divided image data that includes the margin data.

* * * * *